US010877920B2

(12) United States Patent
Lockwood

(10) Patent No.: US 10,877,920 B2
(45) Date of Patent: Dec. 29, 2020

(54) COMMUNICATIONS DEVICE FOR ROUTING SIGNALS ON COMMUNICATIONS NETWORKS

(71) Applicant: AVI PTY LTD, Booragoon (AU)

(72) Inventor: Christopher James Lockwood, Melville (AU)

(73) Assignee: AVI PTY LTD, Booragoon (AU)

( * ) Notice: Subject to any disclaimer, the term of this patent is extended or adjusted under 35 U.S.C. 154(b) by 69 days.

(21) Appl. No.: 15/765,616

(22) PCT Filed: Oct. 14, 2016

(86) PCT No.: PCT/AU2016/050971
§ 371 (c)(1),
(2) Date: Apr. 3, 2018

(87) PCT Pub. No.: WO2017/063050
PCT Pub. Date: Apr. 20, 2017

(65) Prior Publication Data
US 2018/0276173 A1 Sep. 27, 2018

(30) Foreign Application Priority Data
Oct. 16, 2015 (AU) .............................. 2015904257

(51) Int. Cl.
G06F 13/42 (2006.01)
H04L 12/46 (2006.01)
G06F 13/40 (2006.01)
H04L 12/713 (2013.01)

(52) U.S. Cl.
CPC ...... G06F 13/4221 (2013.01); G06F 13/4022 (2013.01); G06F 13/4068 (2013.01); H04L 12/4625 (2013.01); H04L 45/586 (2013.01); G06F 2213/0024 (2013.01); G06F 2213/0026 (2013.01); G06F 2213/0032 (2013.01)

(58) Field of Classification Search
CPC ............ G06F 13/4221; G06F 13/4068; G06F 13/4022; G06F 13/38; G06F 2213/0024; G06F 2213/0026; G06F 2213/0032; H04L 45/586; H04L 12/4625; H04L 49/35
See application file for complete search history.

(56) References Cited

U.S. PATENT DOCUMENTS

2006/0242333 A1    10/2006  Johnsen et al.
2012/0030306 A1*   2/2012   Kami .................... G06F 3/0617
                                                      709/213
2015/0067229 A1    3/2015   Connor et al.

OTHER PUBLICATIONS

International Search Report for Application No. PCT/AU2016/050971 dated Jan. 9, 2017, 3 pages.

* cited by examiner

Primary Examiner — Glenn A. Auve
(74) Attorney, Agent, or Firm — Seyfarth Shaw LLP

(57) ABSTRACT

A router for routing signals on communications networks; said router comprising a plurality of I/O ports for input to the router of said signals and for output from the router of said signals; said router comprising at least one microprocessor; said router adapted such that said microprocessor communicates with at least one of said I/O ports independently of any Southbridge or platform controller hub (SPCH) associated with said microprocessor.

33 Claims, 7 Drawing Sheets

COMMUNICATIONS DEVICE FOR ROUTING SIGNALS ON COMMUNICATIONS NETWORKS

CROSS REFERENCE TO RELATED APPLICATIONS

The present application is a US National Stage application of, and claims priority to, PCT/AU2016/050971, filed Oct. 14, 2016, which further claims priority to Australia patent application s/n 2015904257, filed Oct. 16, 2015, the disclosures of which is incorporated herein by reference.

FIELD OF THE INVENTION

This invention is in the field of electronic communications devices, and in particular signal routers for communications networks.

BACKGROUND TO THE INVENTION OF INVENTION

Hardware based routers are typically regarded as being faster and as having greater capacity than software based routers. In Hardware based routers, the routing process is performed through pre-wired logic gate structures, which are configured specifically for routing network data. This is accomplished using ASIC (Application Specific Integrated Circuit) or FPGA (Field Programmable Gate Array) devices which operate in conjunction with a CPU and an operating system. The advantage of using this method is in the ability to process and filter packets with a minimal number of steps, resulting in lower latency, and power saving.

Software based routers are limited by the bandwidth of the data channels, memory, and CPU (Central Processing Unit). The routing process on a software router must use standard instructions of the CPU in a sequence to inspect and evaluate network packet data (that has been copied into memory as an array) sequentially in blocks of bits limited by the CPU architecture (often 32, 64, or 128 bits depending on the CPU instruction set). Therefore to complete a routing process the network packets must be stored in memory, scanned and compared with matching criteria by a programmed sequence of instructions, before being copied to another memory area for further processing or dispatch to a network device. This involves many more steps, and data movements than in a dedicated hardware based routing core. Therefore the network performance of a software based router is strongly determined by the processing, IO and memory capacity of the CPU hosting the routing software.

With advances in CPU capability, the application of a software based router is becoming closer in performance to a hardware based router, and for many applications has adequate performance.

There are advantages in using a software based router implementation. The routing protocols and features can be adapted and upgraded without being tied to a specific hardware processing chain. This might include enhancements to security features, or additional layers of packet inspection otherwise not supported in hardware based routers. Most hardware based routers will offload complex, or additional non hardware supported tasks to a host CPU, thus negating many of the performance advantages of the hardware router in this case. Further, with a general purpose CPU (as opposed to an ASIC or FPGA), other applications can be run on the same hardware platform that might be tightly integrated into the routing function.

A software router implemented using the standard Intel brand CORE architecture has at most eight ×1 PCIe standard ports on which to connect IO interfaces, such as gigabit Ethernet (GbE) interfaces.

This is demonstrated in FIG. 1 which is a schematic representation of a PRIOR-ART software enabled router on a personal computer (PC) 100.

The PC 100 comprises CPU 5, memory 210, PEG port (PCI Express Graphics port) 15 and platform controller hub (PCH) 10. The PEG port 15 interfaces CPU 5 with a PCIe standard ×16 graphics card slot 60. The PCH 10 provides the base interface requirements for PC 100, including BIOS, system storage (SATA) port 30, USB ports 35 and audio ports 25.

The PCH 10 comprises eight ×1 PCIe ports 80a-80h, which allow PC 100 to be configured with various input/output devices (IO devices). Each ×1 PCIe port 80a-80h is connected to a PCIe ×1 slot 40a-40h respectively, to which a GbE controller may be connected.

It is possible to connect additional IO interfaces to each individual ×1 PCIe port via a multi-port PCIe switch, however this use of multiple IO interfaces per ×1 PCIe port results in the ×1 PCIe bandwidth being shared between these IO interfaces. This can result in each IO interface supporting reduced maximum bandwidth when compared to the same IO interface connected to a dedicated PCIe ×1 port.

The present invention is based on the realisation that in some software router applications high bandwidth graphics output ports have only limited use.

Statements of Invention

According to a first aspect of the present invention there is provided a router adapted to route signals on communications networks; said router comprising a plurality of I/O ports for input of signals to the router from said communications networks and for output of signals from the router to said communications networks; said router comprising at least one microprocessor in communication with a Southbridge or platform controller hub (SPCH); said router adapted such that at least a portion of said signals are transferred between said microprocessor and at least one of said I/O ports independently of the SPCH.

Preferably router further comprising at least one multi-lane PCI graphics port adapted to facilitate said transfer of said at least a portion of said signals between said microprocessor and at least one of said I/O ports independently of the SPCH associated with said microprocessor.

Preferably said at least one multi-lane PCI graphics port is configured to operate as at least two PCI sub-ports and at least one of said PCI sub-ports is a multi-lane PCI port.

Preferably said at least one multi-lane PCI graphics port is configured so as to be bifurcated whereby it operates with two PCI sub-ports and at least one of said PCI sub-ports is a multi-lane PCI port.

Preferably said at least one multi-lane PCI graphics port is configured so as to be trifurcated whereby it operates with three PCI sub-ports and at least one of said PCI sub-ports is a multi-lane PCI port.

Preferably at least one PCI switch interfaces with said at least one multi-lane PCI graphics port so as to provide multiple single lane PCI ports such that at least one of said single lane PCI ports communicates with at least one of said I/O ports thereby facilitating at least one single lane PCI communication path between said at least one I/O port and said microprocessor; said at least one single lane PCI communication path being routed to said microprocessor independently of any SPCH associated with said microprocessor.

Preferably at least one PCI switch interfaces with at least one of said multi-lane sub-ports so as to provide multiple single lane PCI ports such that at least one of said single lane PCI ports communicates with at least one of said I/O ports thereby facilitating at least one single lane PCI communication path between said at least one I/O port and said microprocessor; said at least one single lane PCI communication path routed to said microprocessor independently of any SPCH associated with said microprocessor.

Preferably said single lance PCI port communicates with an I/O controller associated with said at least one I/O port.

Preferably said at least one multi-lane PCI graphics port supports automatic fall-back of PCI lanes.

Preferably at least one of said sub-ports support automatic fall-back of said PCI lanes such that at least one multi-lane PCI switch has fewer PCI lanes than the sub-port it interfaces with.

Preferably said at least one multi-lane switch is a four lane PCI switch and said at least one sub-port is configured as an eight lane PCI port.

Preferably said PCI port is bi-furcated so as to provide two sub-ports and wherein each of said sub-ports is in communication with a multi-lane PCI switch so as to convert each multi-lane sub-port into multiple single lane sub-ports.

Preferably each of said sub-ports is an eight lane sub-port and each of said switches is a four lane PCI switch whereby each of said sub-ports is in communication with four single lane PCI ports and wherein at least one of said single lance PCI ports facilitates a single lane PCI communication path between said microprocessor and at least one of said I/O ports independently of said SPCH.

Preferably at least one multi-lane PCI I/O controller is arranged to communicate with at least one of said sub-ports whereby providing multiple single lane I/O controllers in communication with said at least one multi-lane sub-port.

Preferably said at least one sub-port supports automatic fall-back whereby said multi-lane PCI I/O controller has fewer lanes than said sub-port.

Preferably said at least one sub-port is an eight lane PCI port and said multi-lane PCI I/O controller is a 4 lane PCI I/O controller.

Preferably said router further comprises at least one PCI communications port providing a PCI communications path to said microprocessor through said SPCH.

Preferably said multi-lane PCI graphics port is incorporated within said microprocessor.

Preferably said router further comprises a cooling arrangement which in operation cools at least one of said microprocessor, said SPCH, said PCI switch, said single lane PCI I/O controller and said multi-lane PCI I/O controller so as to enable said router to operate in an ambient operating temperature range of minus twenty nine degrees Celsius to plus sixty three degrees Celsius.

Preferably said router further comprises a cooling arrangement which in operation cools at least one of said microprocessor, said SPCH, said PCI switch, said single lane PCI I/O controller and said multi-lane PCI I/O controller so as to enable said router to operate in an ambient operating temperature range of minus forty degrees Celsius to plus eighty five degrees Celsius.

Preferably said router is a software enabled router.

Preferably said microprocessor is a general purpose microprocessor.

Preferably said router is passively cooled.

Preferably said router is passively cooled with a heat sink.

Preferably said heat sink is thermally coupled to a chassis of said router.

According to a further aspect of the present invention there is provided a router adapted to route signals on communications networks; said router comprising a plurality of I/O ports for input of communication signals to the router from said communications networks and for output of communication signals from the router to said communications networks; said router comprising at least one microprocessor with a dedicated port for communication of graphics data to one or more peripheral devices; the microprocessor further adapted to communicate with a Southbridge or platform controller hub (SPCH), which said SPCH is adapted to provide communication between said microprocessor and at least one peripheral device; and wherein said graphics port and at least one of said I/O ports are configured to provide communication of communications signals between said microprocessor and said at least one I/O port independently of said SPCH.

Preferably said graphics port is a PCI port.

Preferably said graphics port is a PCI port configured to operate as at least two sub-ports.

Preferably said graphics port is configured so as to be bifurcated whereby providing said at least two sub-ports.

Preferably said graphics port is configured so as to be trifurcated whereby providing at least three sub-ports.

Preferably said graphics port is a PCI port supporting automatic fall back of PCI lanes.

Preferably said graphics port is a PCI port configured to operate as at least two sub-ports and wherein at least one of said sub-ports is a multi-lane sub-port, and wherein said multi-lane sub-port supports automatic fall-back of said PCI lanes; and wherein at least one multi-lane PCI switch is in communication with said at least one multi-lane sub-port so as to provide a plurality of single lane PCI ports; at least one of said single lane PCI ports providing a communications path between said at least one I/O port and said microprocessor independent of any SPCH.

Preferably said router further comprises at least two PCI switches each of which is in communication with one of said multi-lane sub-ports so as to provide multiple single lane PCI ports associated with said graphics port and said I/O ports of said router.

Preferably said at least one single lane PCI port is in communication with a PCI I/O controller associated with said at least one I/O port.

Preferably said graphics port is a PCI port configured to operate as at least two sub-ports and wherein at least one of said sub-ports is a multi-lane sub-port, and wherein said at least one multi-lane sub-port supports automatic fall-back of said PCI lanes; and wherein at least one multi-lane PCI I/O controller is in communication with said at least one multi-lane sub-port so as to provide a plurality of single lane PCI I/O controllers, at least one of which is associated with said at least one I/O port; and wherein a communications path between said at least one I/O port and said microprocessor comprising said multi-lane sub-port and said multi-lane PCI I/O controller is independent of any SPCH.

According to a further aspect of the present invention there is provided a method of routing signals within at least one communications network comprising at least one router, and wherein said router comprises:

a) a plurality of I/O ports for receiving signals from said at least one communications network and for output of signals to said at least one communications network, b) at least one microprocessor in communication with a multi-lane PCI graphics port; and c) a first communications path between a first one of said I/O ports and said multi-lane PCI graphics port that is independent of a Southbridge or PCH (SPCH) associated with said microprocessor;

the method comprising the steps of:
i. receiving a signal at one of said I/O ports;
ii. transferring said signal to said microprocessor;
iii. processing said signal in said microprocessor using routing software to produce a processed signal; and
iv. transferring said processed signal to one of said I/O ports;

wherein said transferring of said signal in at least one of step ii) or step iv) comprises transferring said signal on said first communications path.

Preferably said router is further configured such that said multi-lane PCI graphics port is configured to operate with at least two sub-ports and at least one of said sub-ports is incorporated within said first communications path and wherein said transferring of said signal on said first communications path further comprises transferring said signal to said at least one of said sub-ports of said PCI graphics port.

Preferably said router further comprises a multi-lane PCI switch in communication with said at least one of said sub-ports and said transferring of said signal along said first communications path further comprises transferring said signal between:
v) said multi-lane sub-port of said PCI graphics port and a multi-lane port of said PCI switch; and
vi) a single lane port of said PCI switch and said I/O port.

Preferably said router further comprises a multi-lane PCI I/O controller in communication with said at least one of said multi-lane sub-ports and said transferring of said signal along said first communications path further comprises transferring said signal:
v) between said multi-lane sub-port of said PCI graphics port and a multi-lane port of said multi-lane PCI I/O controller; and
vi) between a single lane port of said multi-lane PCI I/O controller and said I/O port.

Preferably said router further comprises a heat sink which in use is thermally coupled to said microprocessor; said heat sink operating to conduct heat away from said microprocessor whereby said router is adapted to operate within a range of ambient operating temperatures comprising minus 30 degrees Celsius to plus 63 degrees Celsius and said method further comprises the step of passively cooling said microprocessor by said heat sink thermally conducting heat to a chassis of said router.

Preferably said temperature range is minus 40 degrees Celsius to plus 85 degrees Celsius.

BRIEF DESCRIPTION OF THE DRAWINGS

Preferred embodiments will now be described with reference to the accompanying drawings in which.

DESCRIPTION OF PREFERRED EMBODIMENTS

Figure 1:
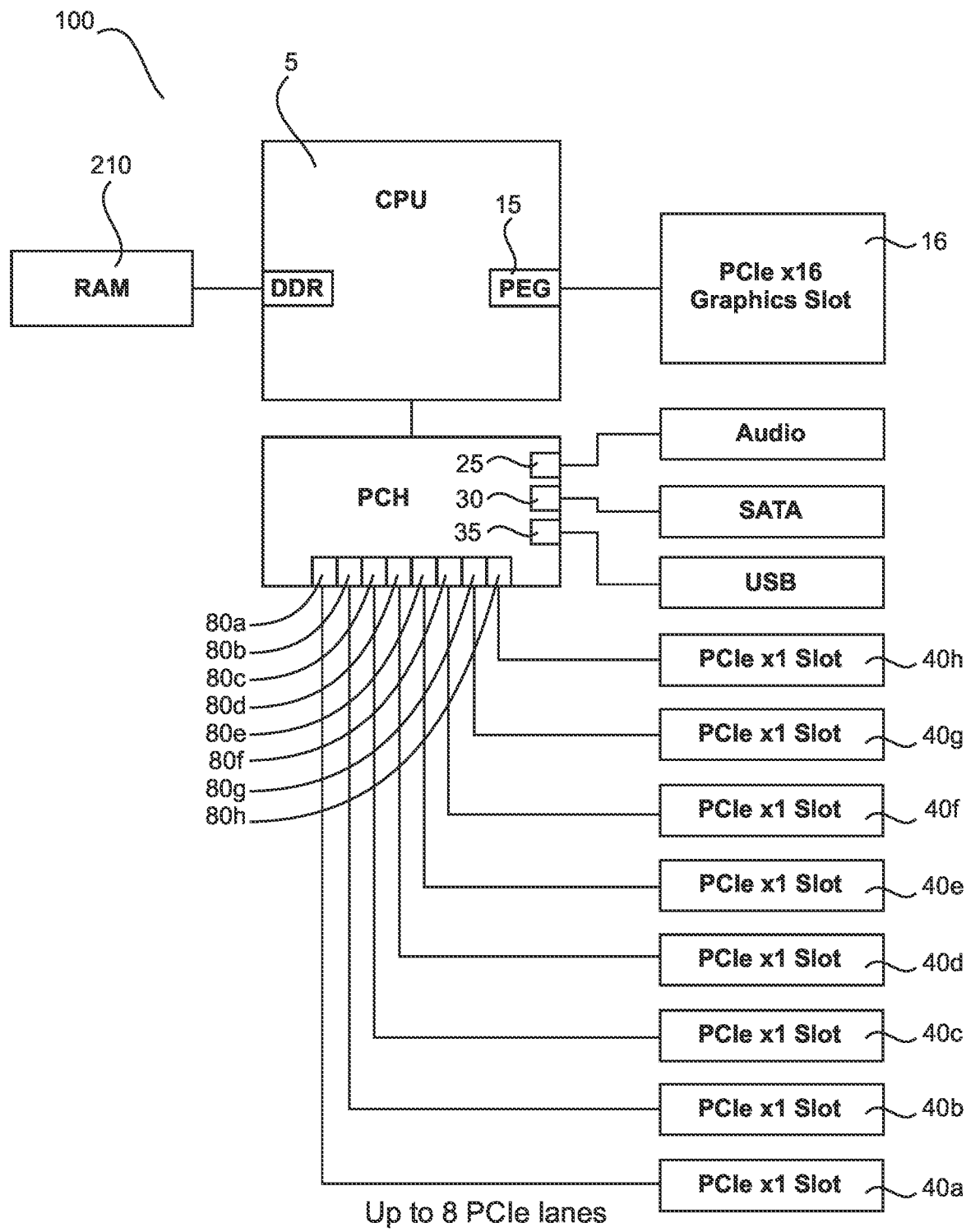
FIG. 1 is a schematic representation of a typical PRIOR ART architecture of a personal computer or server utilising Intel brand microprocessors.

The PCI standard is the Peripheral Component Interconnect standard managed by Peripheral Component Interconnect Special Interest Group (PCI-SIG). The PCI Express standard is a second generation of the PCI standard and is also managed by PCI-SIG. PCI Express may be abbreviated as PCIe.

The PCI standard provides a standard bus configuration primarily for communication between CPUs and peripheral components. The standard provides what are termed communication lanes of the bus. PCI ports can be single lane ports (×1 ports), double lane ports (×2 ports), four lane ports (×4 ports), eight lane ports (×8 ports), sixteen lane ports (×16 ports), and so on up to ×32 ports.

A single lane PCI port (i.e. an ×1 port) can support a single gigabit ethernet controller (GbE) at full bandwidth for PCIe version 2.0 and above.

Intel brand CORE processor architecture utilises a CPU with a separate platform controller hub (PCH) interface integrated circuit (IC) to manage peripherals and IO interfaces to the CPU and/or system memory. Other types of central processing units that incorporate an architecture similar to Intel's CORE architecture include AMD brand FX central processing unit, which combines with an AMD brand Northbridge interface IC and an AMD brand Southbridge interface IC. The functionality of AMD's Southbridge IC is similar to Intel's PCH. In Intel's CORE processor architecture, many of the functions of the Northbridge are integrated with the CPU in a single integrated circuit.

In this specification the term SPCH is used to refer to a Southbridge, a PCH or similar integrated circuit whose function is to control input and output (IO) between peripheral devices and a CPU and/or system memory and is distinct from a PEG port.

The Intel brand CORE processors have a PCI Express Graphics port which is a PCIe ×16 lane port, referred to as a PEG port, which is typically used to provide a high bandwidth graphics output from the CPU. The AMD microprocessor referred to above also supports a graphics port on its Northbridge IC. The PEG port on the Intel brand CORE processors and the graphics port on AMD brand microprocessors both receive graphics signals from the CPU and/or system memory independently of their respective Southbridge or PCH.

In this specification central processing units (CPUs) are distinguished from ASICs and FPGAs. The term CPU and microprocessor are used interchangeably to refer to general purpose CPUs such as Intel brand i5 and i7 processors, and AMD processors referred to above.

In this specification, unless the contrary is expressly stated, reference to a PCI Express Graphics port, multi-lane PCI graphics port or a PEG port includes: i) a reference to a PEG port that is integrated with a CPU; and ii) a reference to a PEG port that is contained in a Northbridge integrated circuit (that is separate from the CPU).

Intel ×16 PCI Express Graphics (PEG) ports support bi-furcation, where the single ×16 port is split into two sub-ports being two ×8 ports, allowing two end-point devices to be directly connected to the CPU 5. 4th and 5th generation Intel Core devices also support tri-furcation, where the PEG port 15 is split into three sub-ports, being two ×4 ports and a single ×8 port. This allows three end-point devices to be directly connected to the CPU 5 and/or system memory.

The fourth and fifth generation of the Intel CORE i5 and i7 processors also support automatic fall back of sub-ports arising from the bi-furcation and tri-furcation of a PEG port. In particular, ×8 PCIe ports can automatically fall back to operate as a ×4, ×2 or ×1 port. Automatic fall back of tri-furcated ×4 PCIe ports to ×2 or ×1 ports arising from tri-furcation of PEG ports is also supported.

Figure 2:
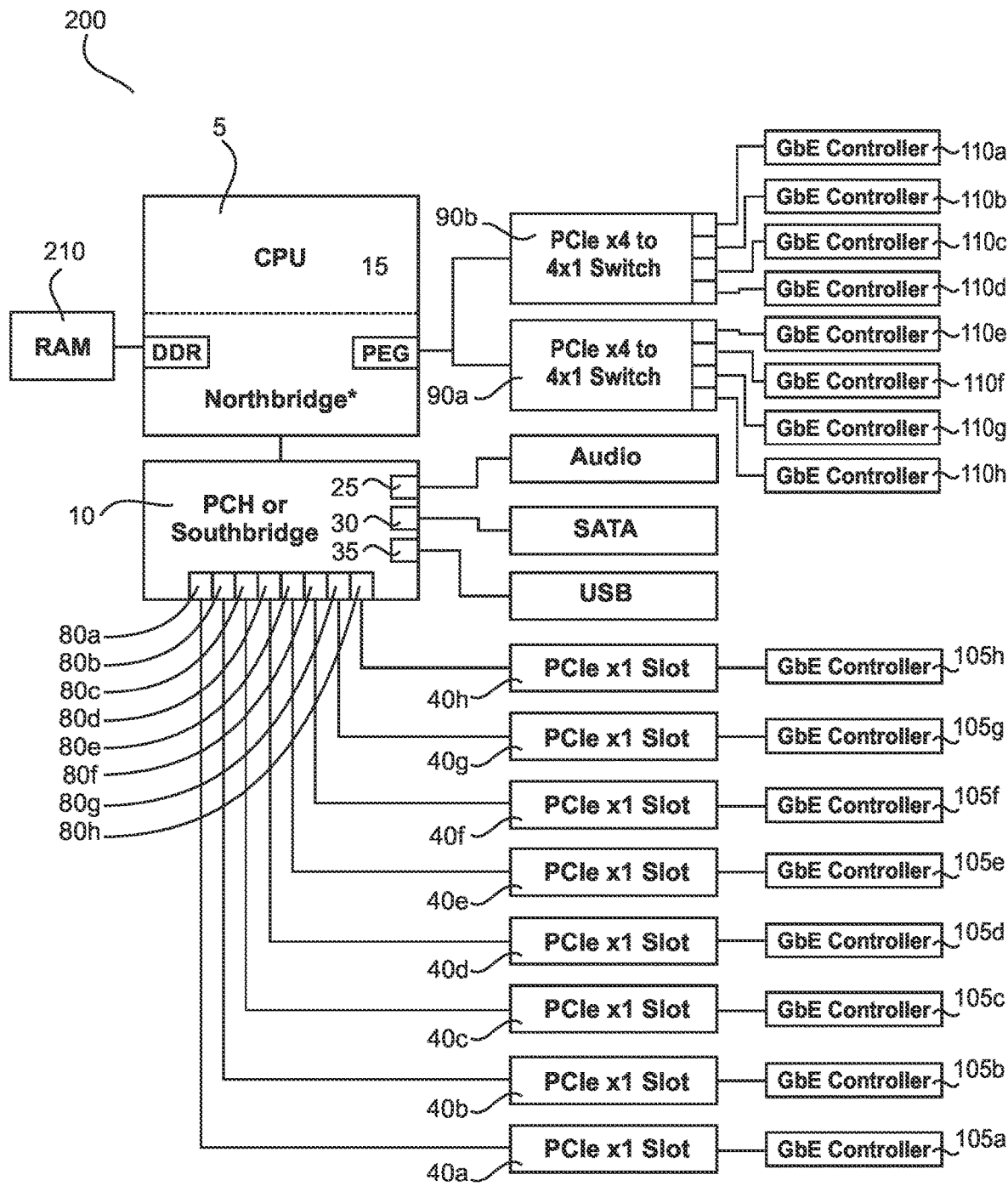
FIGS. 2 and 2a are schematic representation of a dedicated software router incorporating eight single lane PCIe GbE IO ports which route signals to the CPU and/or system memory though the SPCH, and a bi-furcated PEG port which supports eight single lane PCIe GbE IO ports which route signals to the CPU and/or system memory independently of the SPCH.
Figure 2:
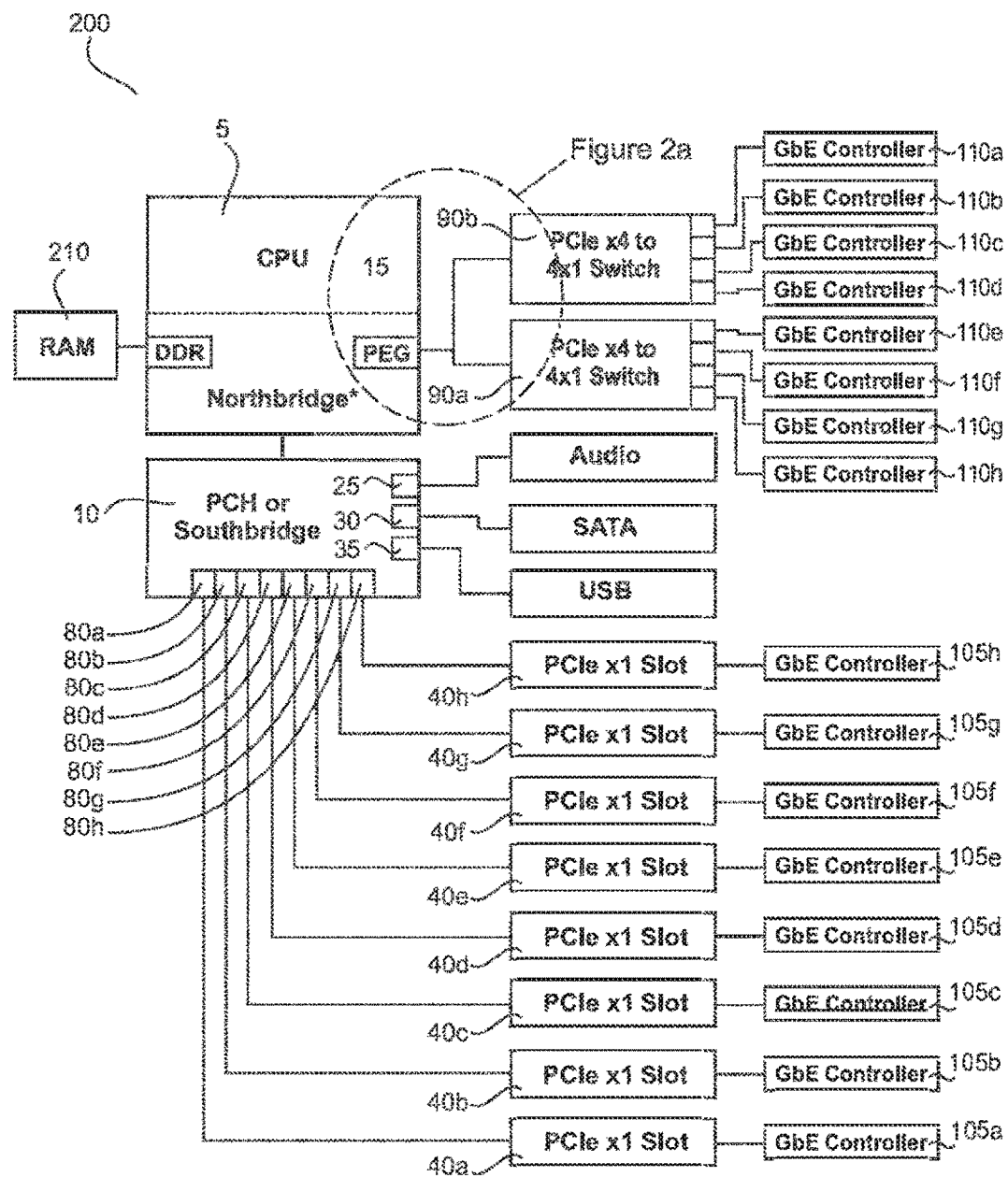
Figure 2A:
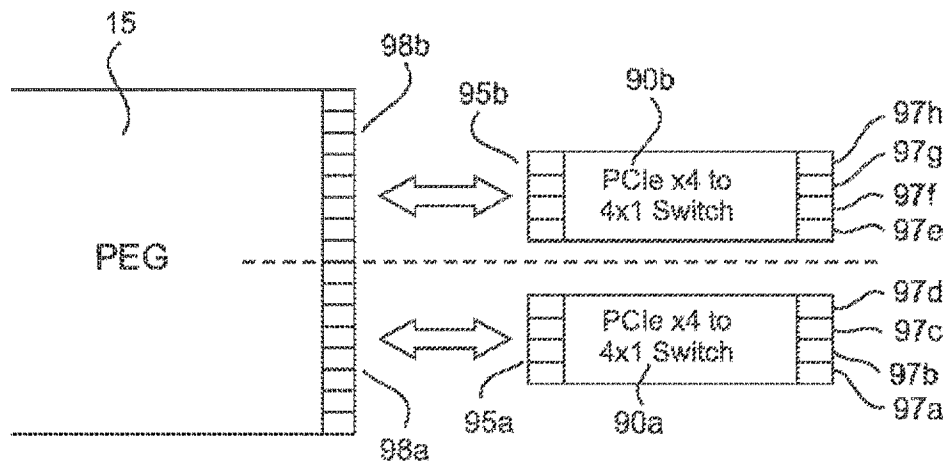

The provision of PEG port bi-furcation and tri-furcation with automatic fall back broadens the range of chip sets available for use with PEG (PCIe express graphics ×16) ports. For example, "×4 to 4×1" switches and Intel quad GbE controllers (as depicted in FIGS. 2 and 2a) can be used in conjunction with the ×8 ports that result from bi-furcation and tri-furcation of the PEG port.

Whilst use of a "×4 to 4×1" switch on an ×8 port does reduce the number of ×1 PCIe lanes available to the router (compared with using an "×8 to 8×1" switch), it does allow the selection of components such as PCIe switches and/or quad GbE controllers which are able to operate within a wide range of ambient operating temperatures and/or with low power consumption. This is important for applications which are required to operate over an extreme range of ambient temperatures and/or with passive cooling. Such applications are often referred to as "extreme rugged" applications.

The term "extreme rugged" is used in this specification to refer to an electronic device that is rated to operate over a wide range of ambient operating temperatures, such as −30 degrees Celsius to +60 degrees Celsius, or even as wide as −40 degrees Celsius to +85 degrees Celsius. Extreme rugged devices are used in a wide range of applications including in aircraft and vehicle electronics, industrial electronics, electronics supporting infrastructure and military applications.

In some extreme rugged applications, passive cooling of the electronics is preferred. Passive cooled electronics are cooled by conduction, typically via a heat sink to an equipment chassis, and are not fan cooled to avoid potential reliability issues associated with moving parts.

Present embodiments use PCI Express Graphics ×16 (PEG) ports for input and output of network communications signals to CPUs and associated routing software, instead of providing a high-bandwidth data path to a dedicated graphics adapter as is typically associated with this type of port. This increases the number of IO interfaces which can be directly connected to the CPU and/or system memory without any need to share PCIe lane bandwidth, as may occur if more than eight lanes are connected through an SPCH. This allows each of these plurality of IO interfaces to be dedicated the full bandwidth of a PCIe ×1 lane, ensuring IO packet data is fed to and received from system memory as fast as the external IO connection can support.

In Intel brand CORE processors, the PEG port is directly connected to the PCIe root complex in the CPU and provides a high-bandwidth connection to the CPU 5 and system RAM 210. This allows additional IO controllers, such as GbE controllers, to be connected to the CPU and/or system memory independently of the SPCH 10 so that the bandwidth of the PCIe lanes connected to the CPU and/or system memory through the SPCH are not reduced due to the presence on any particular PCI lane of multiple I0 ports.

Referring now to FIGS. 2 and 2a which are schematic representation of a software enabled router 200 consisting of a CPU 5 with a ×16 PCI Express Graphics (PEG) port 15 that connects through PCIe switches 90a, 90b to provide eight IO ports 110a-110h which communicate with the CPU 5 and/or system memory independent of PCH 10.

The embodiment of FIGS. 2 and 2a is configured to have a bi-furcated PCI Express Graphics (PEG) port 15 through which it provides two ×8 sub-ports. The ×8 sub-ports automatically fall back to a ×4 configuration and together provide eight GbE controllers 110a-110h. In addition, a further eight GbE controllers 105a-105h are provided through the PCH 10.

The GbE controllers 110a-110h are connected to the PEG port via two "×4 to 4×1" PCIe switches 90a and 90b. These switches 90a and 90b convert an ×4 PCI Express port into four ×1 PCI Express ports. This is achieved by each ×4 PCIe port 95a and 95b of the switches 90a and 90b being connected to one of the ×8 PCIe ports of the bi-furcated PEG port. Support for automatic fall back within an ×8 PCIe port enables it to operate as a ×4 PCIe port when it is connected to a "×4 to 4×1" PCIe switch. The other side of the switch 90a and 90b provides the four ×1 PCIe ports. 97a, 97b, 97c, 97d, 97e, 97f, 97g and 97h. Individual GbE controllers 110a-110h are connected to the ×1 PCIe ports 97a, 97d, 97c, 97d, 97e, 97f, 97g and 97h.

This method is attractive in "extreme rugged" applications because it is possible to select "×4 to 4×1" PCIe switches and single port GbE controllers which are qualified to operate over an extended temperature range of −40° C. to +85° C.

Each PCIe ×1 port 97a-97h can support a single GbE controller 110a-110h at full throughput. By using the two "×4 to 4×1" switches 90a and 90b, there is provided an additional eight GbE controllers 110a-110h which are incorporated within the router, independently of PCH 10 and the associated eight GbE controllers 105a-105h that are routed through PCH 10. This avoids the reduction in bandwidth and/or performance associated with connecting more than one ×1GbE controller to any of the ×1 PCIe ports 80a-80h provided on the PCH 10.

Accordingly, all 16 GbE controllers on the router can operate at their full bandwidth and without degrading the bandwidth of any other GbE ports on the router. In addition, power dissipation requirements of this configuration allow the application to be rated as "extreme rugged" once suitable heat sinks, as are commonly known in the industry, are attached.

Figure 3:
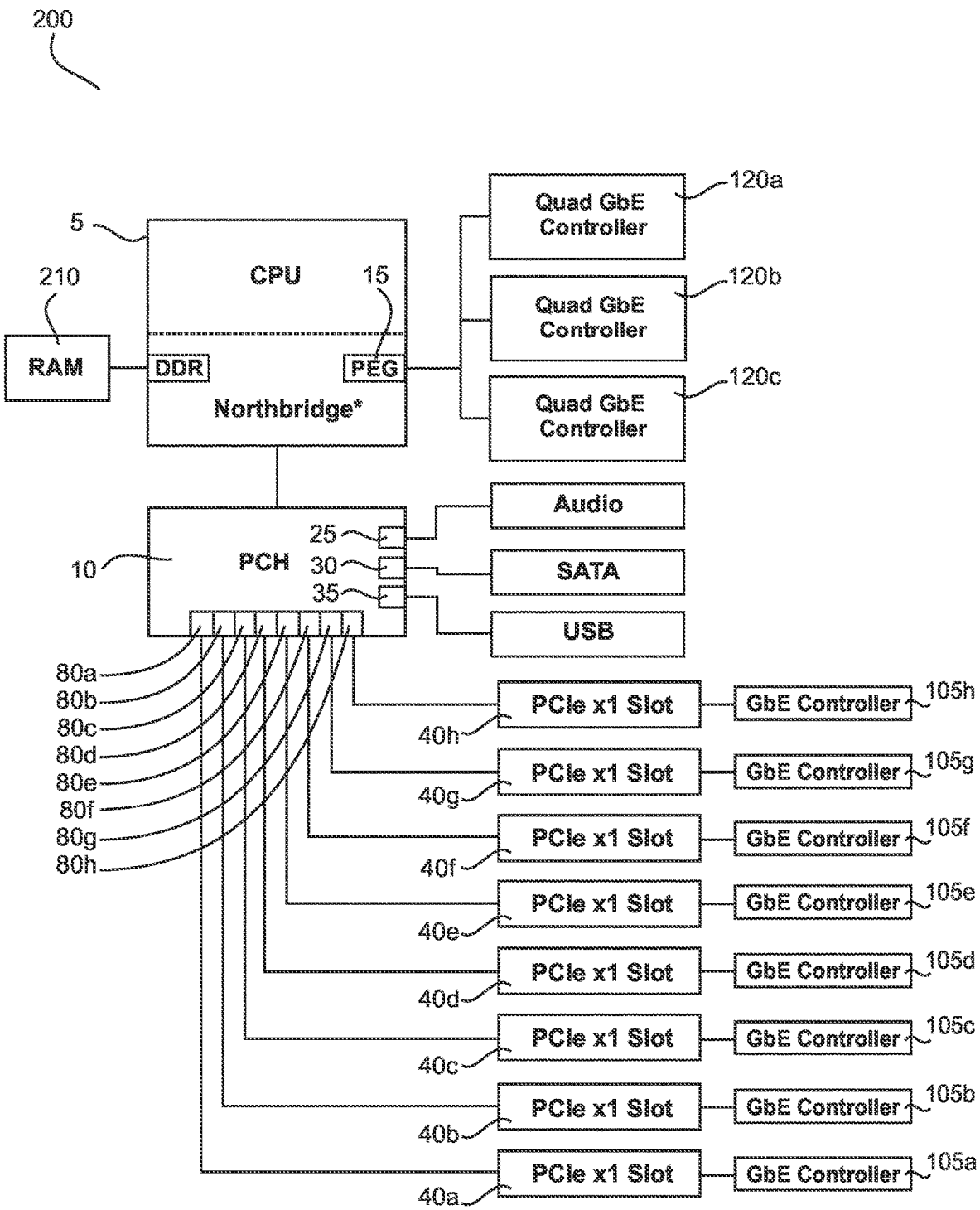
FIGS. 3 and 3a are schematic representation of a dedicated software router incorporating eight single lane PCIe GbE IO ports which route signals to the CPU and/or system memory though the SPCH and a tri-furcated PEG port which supports twelve PCIe GbE IO ports which route signals to the CPU and/or system memory independently of the SPCH.
Figure 3A:
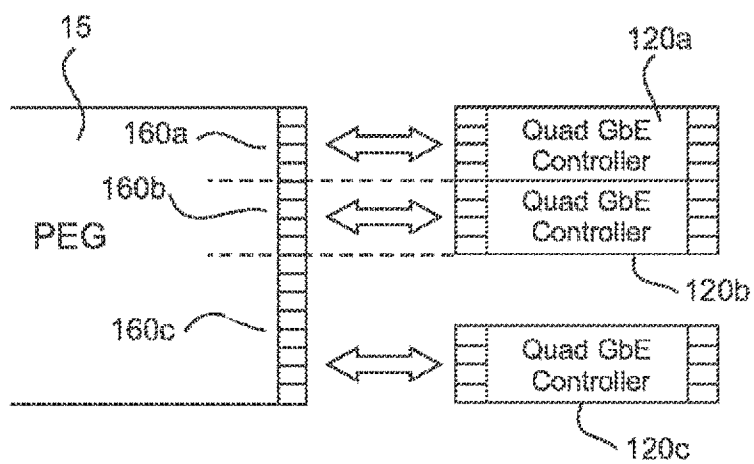

Referring now to the embodiment of FIGS. 3 and 3a which uses tri-furcation to split the PEG port 15 into two ×4 160a, 160b and one ×8 160c PCIe ports.

The ×8 port 160*c* of the tri-furcated PEG port can automatically fall back to a ×4 port. Accordingly, the arrangement of FIGS. 3 and 3*a* effectively provides three ×4 ports which may be directly connected to Quad GbE controller ICs 120*a*, 120*b* and 120*c* which natively supports the PCIe ×4 link.

This approach is attractive because PCI switches are not required, meaning the total system power is lower than that of the system depicted in FIGS. 2 and 2*a* using the "×4 to 4×1" switches 90*a* and 90*b* and individual GbE controllers 110*a*-110*h*.

The system of FIGS. 3 and 3*a* provides up to 20 GbE controllers, comprising twelve GbE controllers from the three Quad GbE controllers 95*a*-95*c* that provide signal paths to the CPU 5 and/or system memory independent of the PCH 10, along with the eight GbE controllers 105*a*-105*h* that are routed through the PCIe IO controllers of the PCH 10.

The system of FIGS. 2 and 2*a* has higher power consumption than the system of FIGS. 3 and 3*a*, however the point heat loadings of the system of FIGS. 2 and 2*a* at the interface of the component ICs with the heat sink is lower than the point heat loadings of the system of FIGS. 3 and 3*a*. This is because the power load of the system of FIGS. 2 and 2*a* is distributed across the two PCI switches 90*a* and 90*b* and the eight GbE controllers (ten ICs in total), whereas the heat load of the system of FIGS. 3 and 3*a* is distributed across the three Quad GbE controllers. Accordingly, the heat load of the system of FIGS. 2 and 2*a* is distributed across a greater surface area of the heat sink than the heat load of the system of FIGS. 3 and 3*a*. This provides the system of FIGS. 2 and 2*a* with greater heat dissipation than the system of FIGS. 3 and 3*a* and allows the router of FIGS. 2 and 2*a* to operate across a wider range of ambient temperatures than the system of FIGS. 3 and 3*a* (when the same passive cooling arrangement is used). Accordingly, the system of FIGS. 2 and 2*a* has advantages over the system of FIGS. 3 and 3*a* for "extreme rugged" applications, and in particular, passively cooled extreme rugged applications.

Notwithstanding the above, the system of FIGS. 3 and 3*a* has lower power consumption than the system of FIGS. 2 and 2*a*. This arises from the design of the Quad GbE controllers which are of a bridgeless design. PCIe switches, such as the "×4 to 4×1" switches 90*a* and 90*b* of FIGS. 2 and 2*a*, typically utilise bridges, which have higher rates of power consumption than non-bridge based designs.

Figure 4:
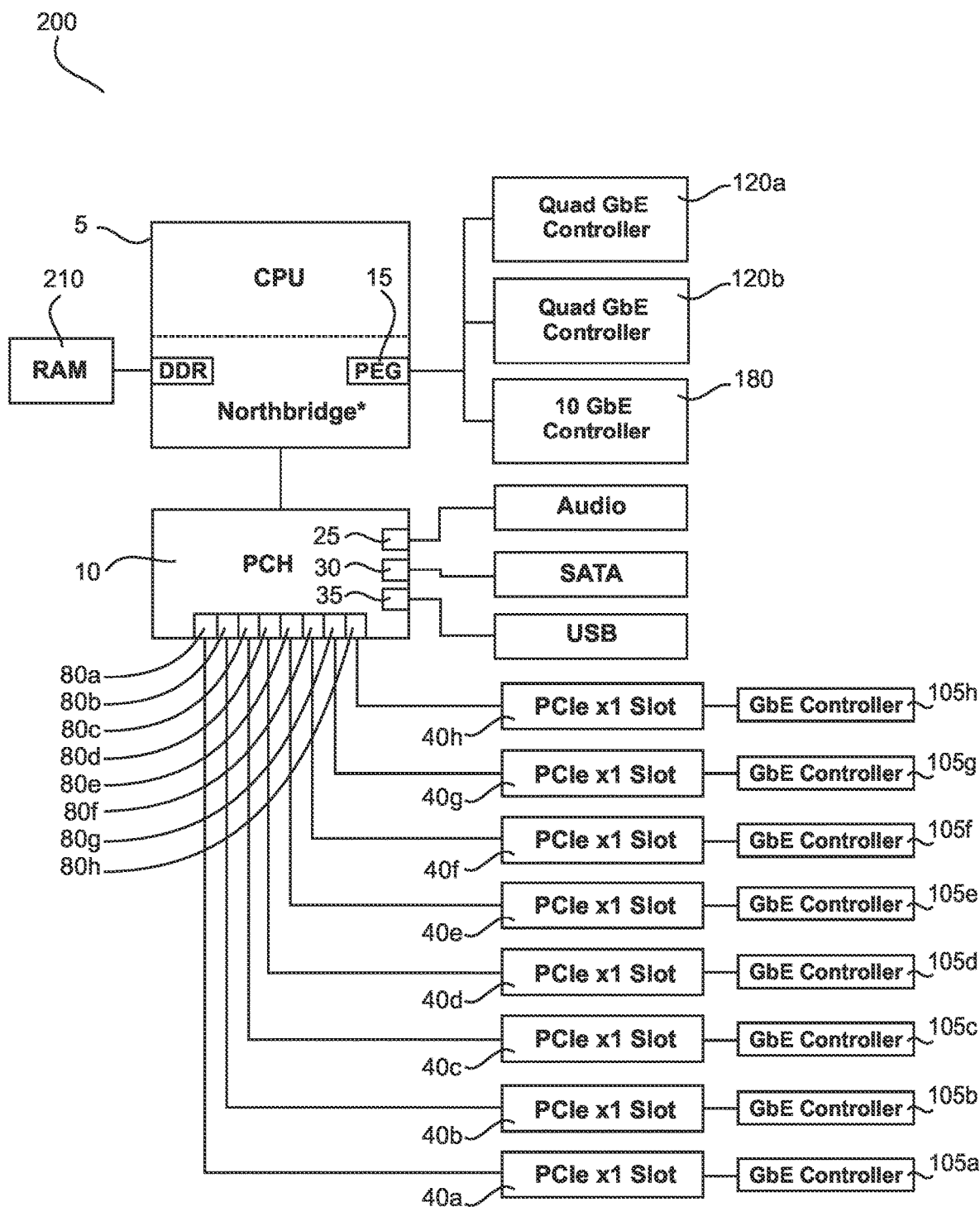
FIG. 4 is a schematic representation of a dedicated software router incorporating eight single lane PCIe GbE IO ports which route signals to the CPU and/or system memory though the SPCH and a tri-furcated PEG port which supports eight single lane PCIe GbE IO ports and one 10 GbE IO port which route signals to the CPU and/or system memory independent of the SPCH.
Figure 4A:
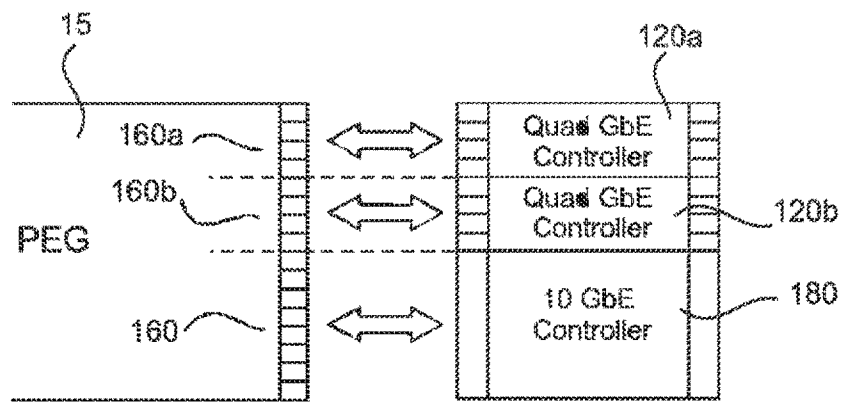
Figure 5:
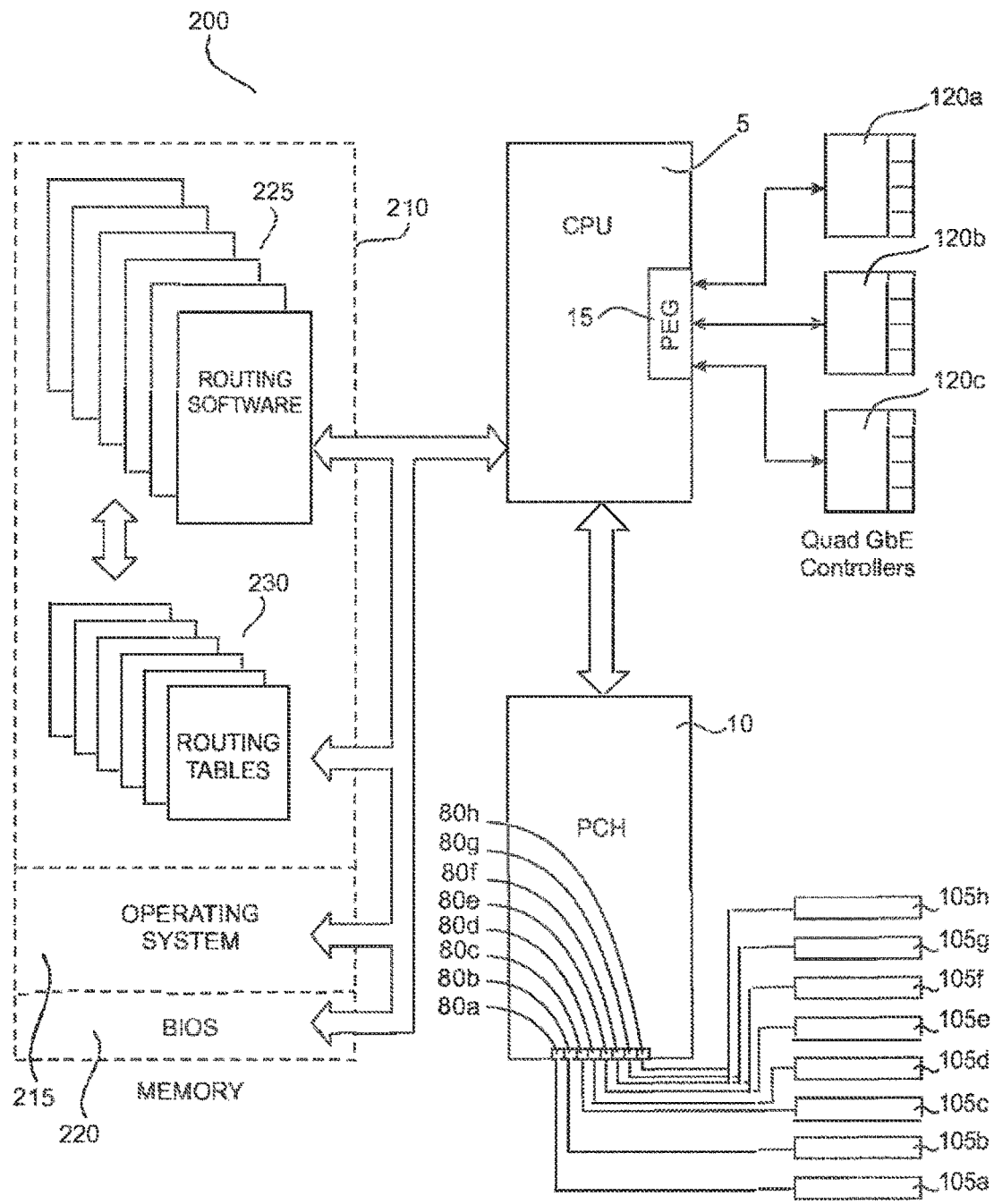
Figure 6:
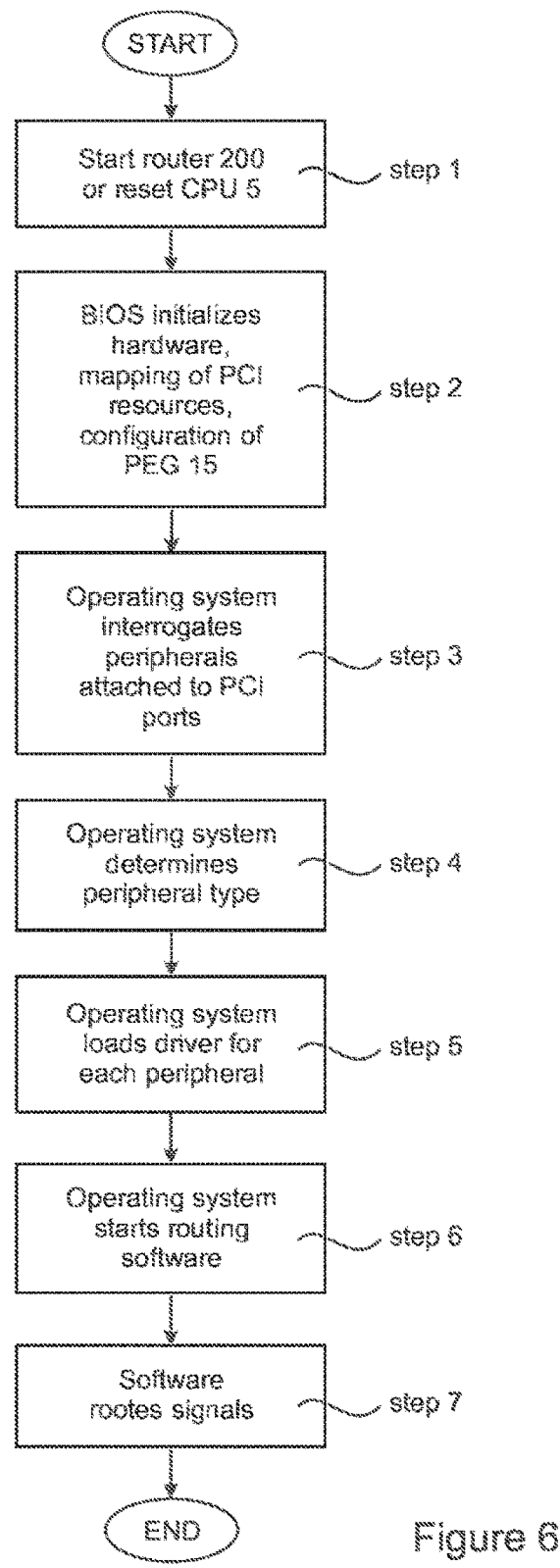
Figure 7:
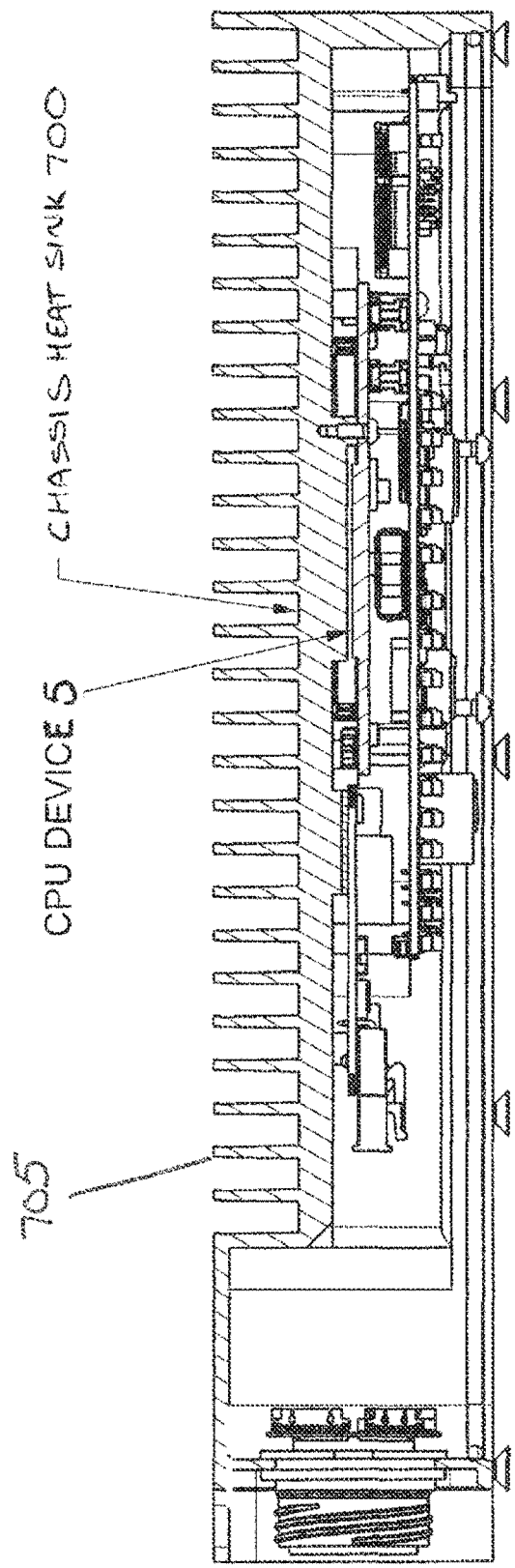

The system of FIGS. 4 and 4*a* is similar to the system of FIGS. 3 and 3*a*, except that the Quad GbE controller attached to the ×8 PCIe port 160*c* is replaced with a 10 GbE controller, which utilises the entire ×8 PCIe lanes of the ×8 PCIe port.

Other router designs using an ×16 PCI Express Graphics (PEG) port are possible. For example, an "×16 to 16×1" switch or two "×8 to 8×1" switches could be utilised instead of the Quad GbE controllers of FIGS. 3 and 3*a* or the "×4 to 4×1" switches of FIGS. 2 and 2*a*. However, such systems will have higher point heat loading due to the higher concentration of PCIe lanes in these larger switches. Such systems may need to be fan cooled and may not be suitable for extreme rugged applications or passively cooled extreme rugged applications. Nonetheless they can provide a software enable router with up to 24 single lane PCIe IO ports at full bandwidth, comprising 16 PCIe IO ports which are routed to the CPU independently of the PCH 10 (i.e. via the PEG port) and a further 8 single lane PCIe IO ports routed to the CPU and/or system memory via the PCH 10.

Preferred embodiments also use CPU Carrier boards made in accordance with the COM Express standard. The PCIe switches and Gbe controllers of FIGS. 2 and 2*a* or the Quad GbE controllers of FIGS. 3 and 3*a* are housed on a separate carrier board. Use of COM Express based CPU carrier board has the advantage of being suitable for a passive conduction cooled design. In such designs the chassis of the router can form part of the heat sink. This can be beneficial for extreme rugged applications.

Figure 5:
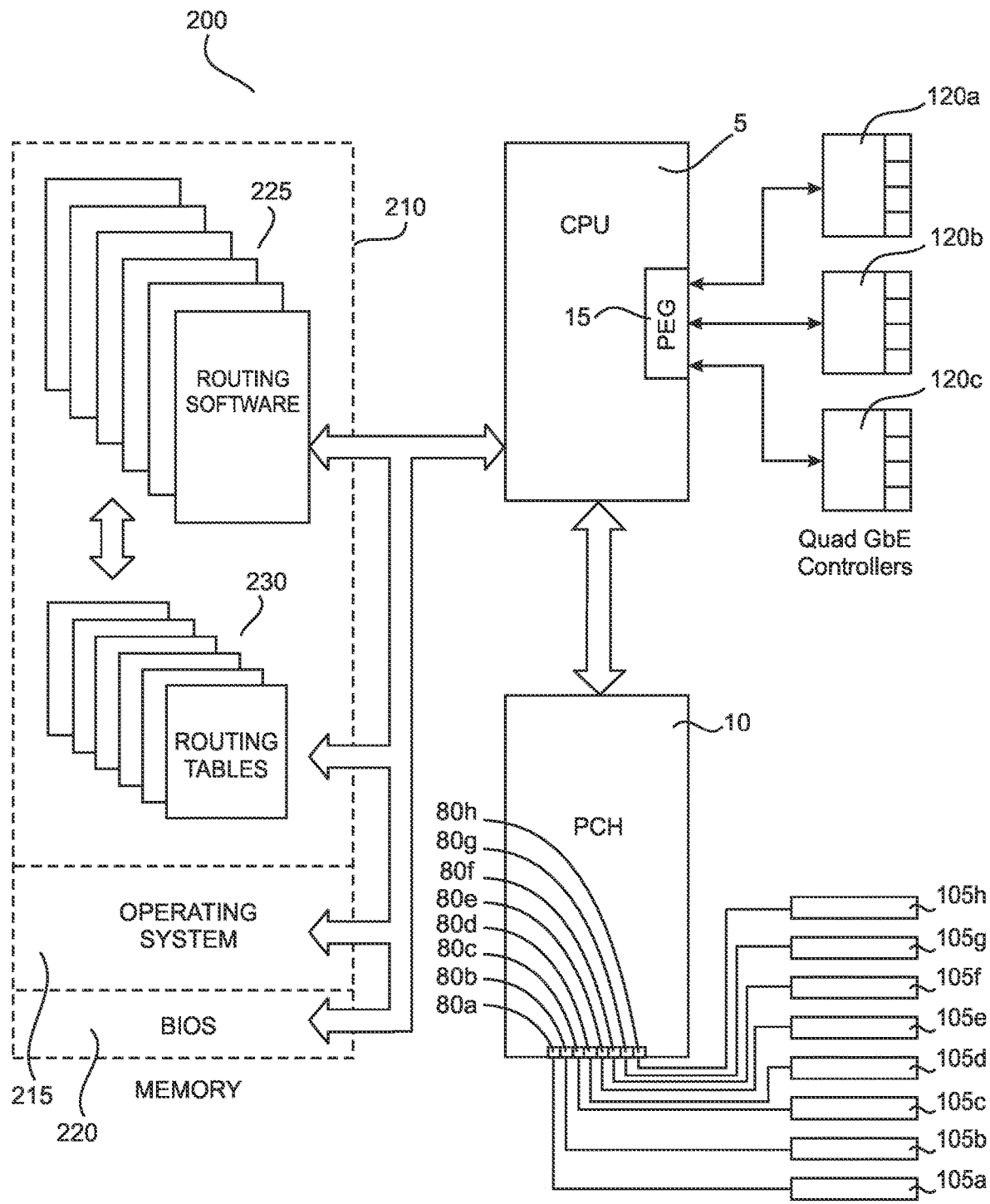
FIG. 5 is schematic representation of the hardware and software used in the routers in FIGS. 2 to 4.

Referring now to FIG. 5 there is provided a schematic representation of the router 200, including the operating system 215, the BIOS 220, routing software 225 and routing tables 230 which are stored in memory 210 and run on the CPU 5.

The operating system may be the Windows operating system from Microsoft, the open source Linux system or Cisco's ESXi operating system.

Multiple virtual machines may be established on the CPU 5 to provide segregation between IO ports 105*a*-105*h* and 110*a*-110*h*.

One or more virtual machines (running guest operating systems) may be run within a hypervisor on a physical machine, such as a router 200 of the type depicted in any one of FIGS. 2, 2*a*, 3, 3*a*, 4 and 4*a*. The hypervisor may or may not run within a host operating system (or may be a component of a host operating system).

Software defined networking between Virtual Machines may be achieved by the creation and connection of virtual network interfaces either within the hypervisor and/or the host operating system. Different virtual machines may also be directly connected to physical network interfaces via either the hypervisor or hypervisor and host operating system.

The PEG port 15 is typically configured through the BIOS, though some COM Express carrier board manufacturers provide DIP switches or configuration ICs.

Figure 6:
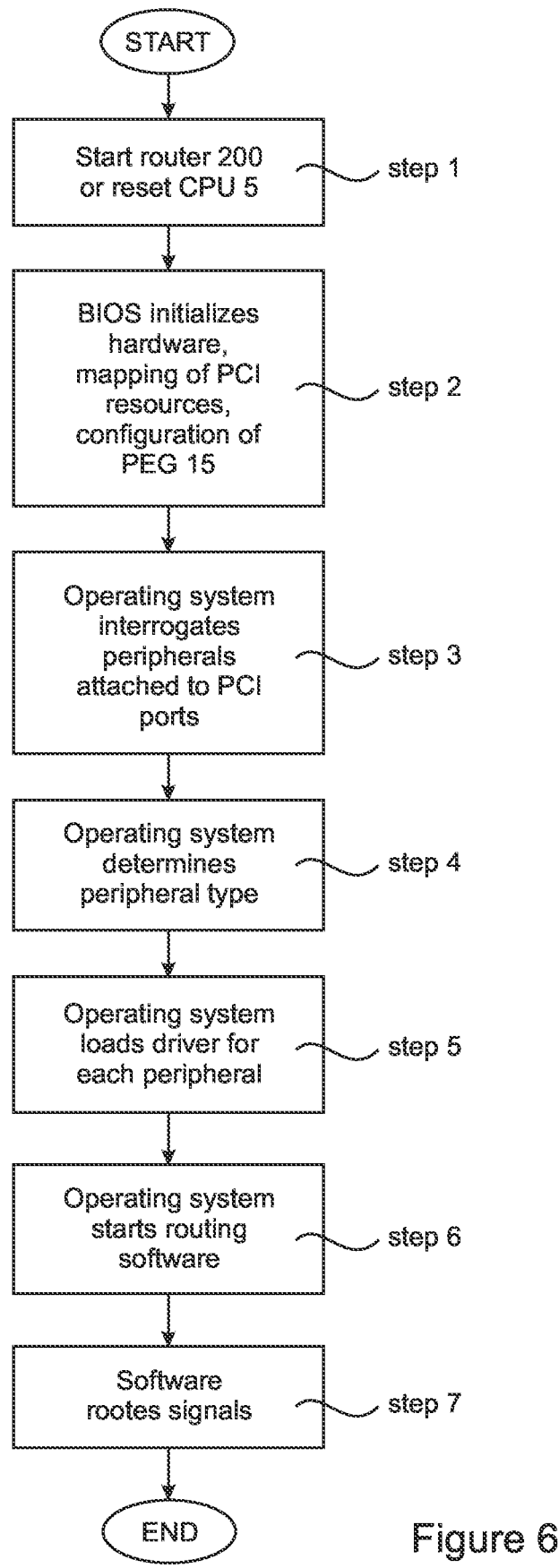
FIG. 6 is flow chart showing initialization of the routers in FIGS. 2 to 4.

Referring now to FIG. 6 there is provided a flow chart for operation of the router 200.

At step 1, the router 200 is powered on, or the CPU 5 is reset.

At step 2, the BIOS 220 initializes the hardware of the router 200 and maps PCIe resources (e.g. PEG 15, switches 90*a* and 90*b* or Quad GbE controllers) for use by the operating system 215. This initialization typically configures the PEG port 15 by setting the relevant pin strapping of the configuration pins of the CPU 5. In alternate embodiments the PEG 15 is configured by use of DIP switches or configuration ICs. The configuration IC may be controlled through the BIOS 220. Configuring the PEG port, bifurcates or trifurcates the port into two or three multi-lane sub-ports as discussed above in relation to FIGS. 2, 2*a*, 3 and 3*a*.

At step 3, the operating system 215 interrogates the peripherals attached to each PCIe port.

At step 4, the operating system 215 waits for a response from the peripherals and then determines the vendor identification and the product identification from the PCIe configuration space in memory (not shown). This enables the operating system 215 to determine the type of peripheral attached to each PCIe port.

At step 5, the operating system 215 loads the appropriate driver for each peripheral on each PCIe port.

At step 6, the operating system starts the routing software.

In operation the router of FIGS. 2 and 2*a* may receive a signal on one of the IO ports 110*a*-110*h* and may route the signal to another one of the IO ports 110*a*-110*h* or one of the IO ports 105*a* to 105*h*. Similarly, the router may receive signals on one of the IO ports 105*a*-105*h* and may route this signal to another one of the IO ports 105*a*-105*h* or to one of the IO ports 110*a*-110*h*.

In operation, the router of FIGS. 4 and 4*a* may receive signals through the 10GbE IO port and route these signals to any one of the IO ports on GbE controllers 120*a* and 120*b* or any of the other PCI IO ports 105*a*-105*h*. Alternately, the router of FIGS. 4 and 4*a* may receive signals on any one of IO ports of GbE controllers 120*a* and 120*b* or any of the other PCI IO ports 105*a*-105*h* and may route some or all of these signals within the IO ports of GbE controllers 120*a* and 120*b* or any of the other PCI IO ports 105*a*-105*h*. Alternately, the router may route some or all of the signals received: i) on any of the IO ports of GbE Controllers 120*a* and 120*b*; or ii) on any of other PCI IO controllers 105*a*-105*h*, to the 10GbE IO port.

Figure 7:
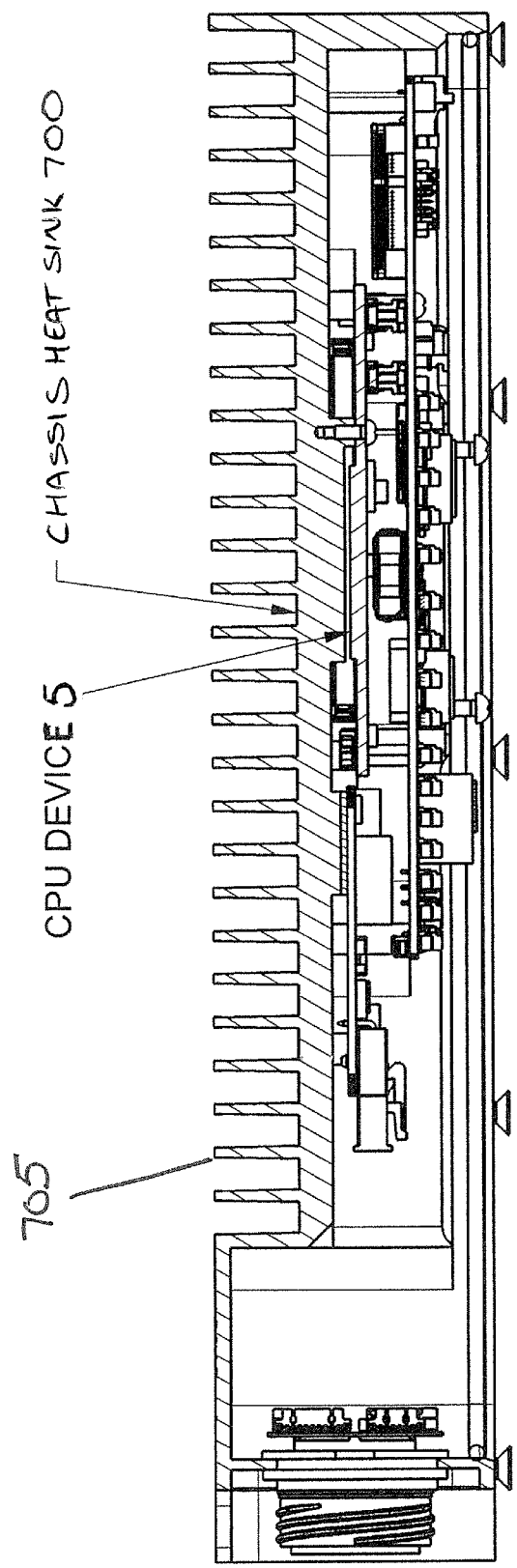
FIG. 7 is a cross sectional drawing of a chassis and CPU of a passively cooled router in accordance with any one of FIGS. 1 to 6.
Figure 1:
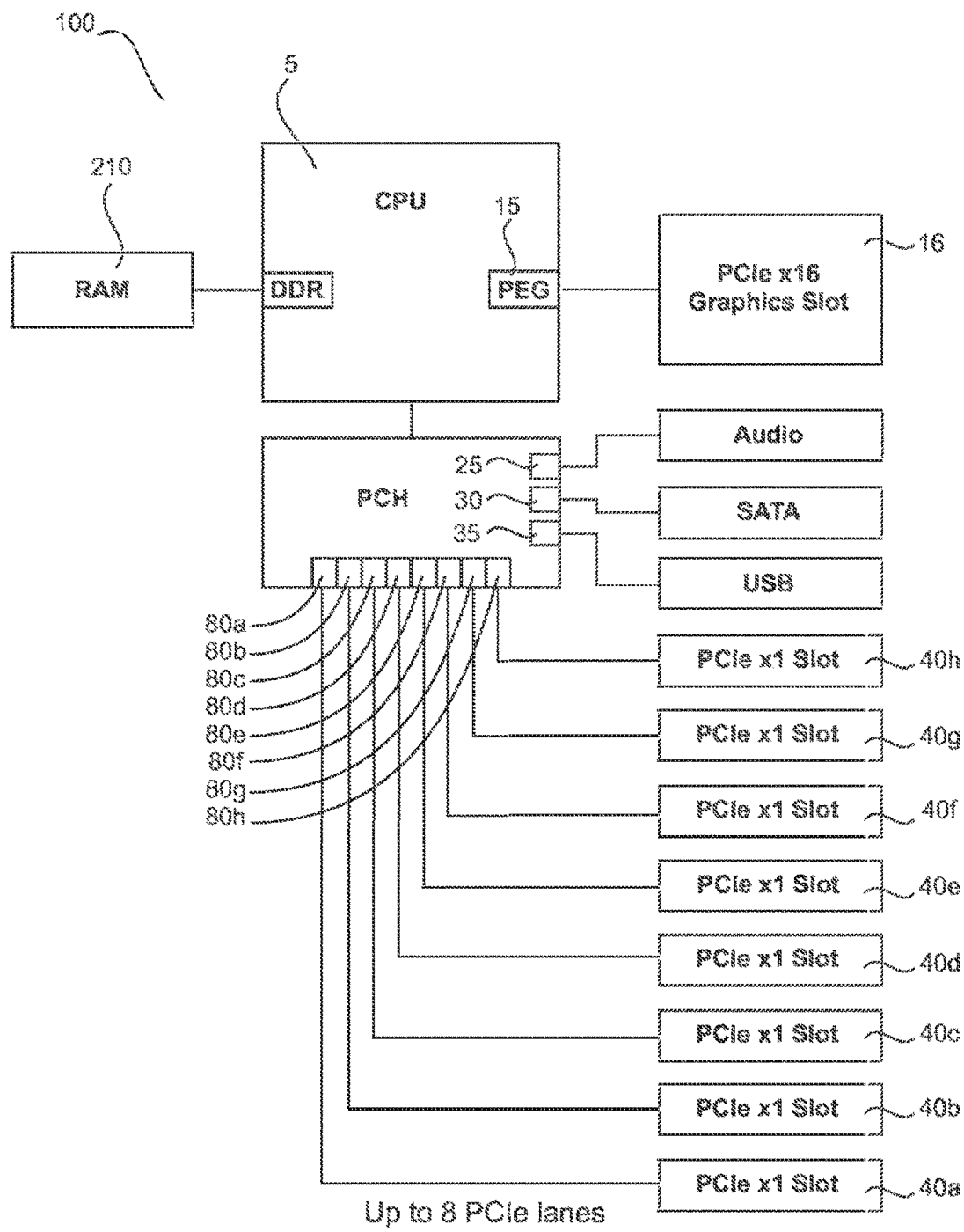
Figure 3:
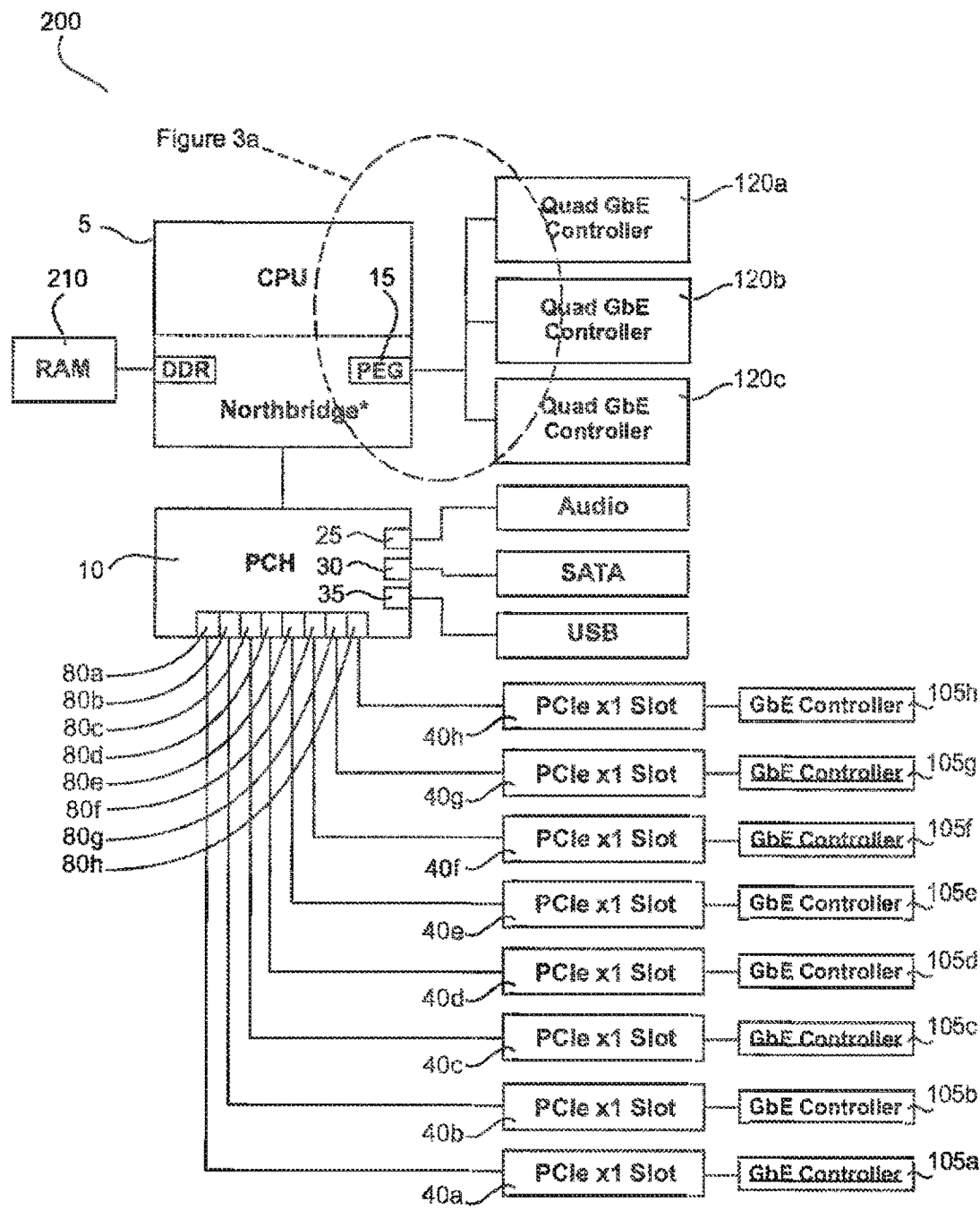
Figure 4:
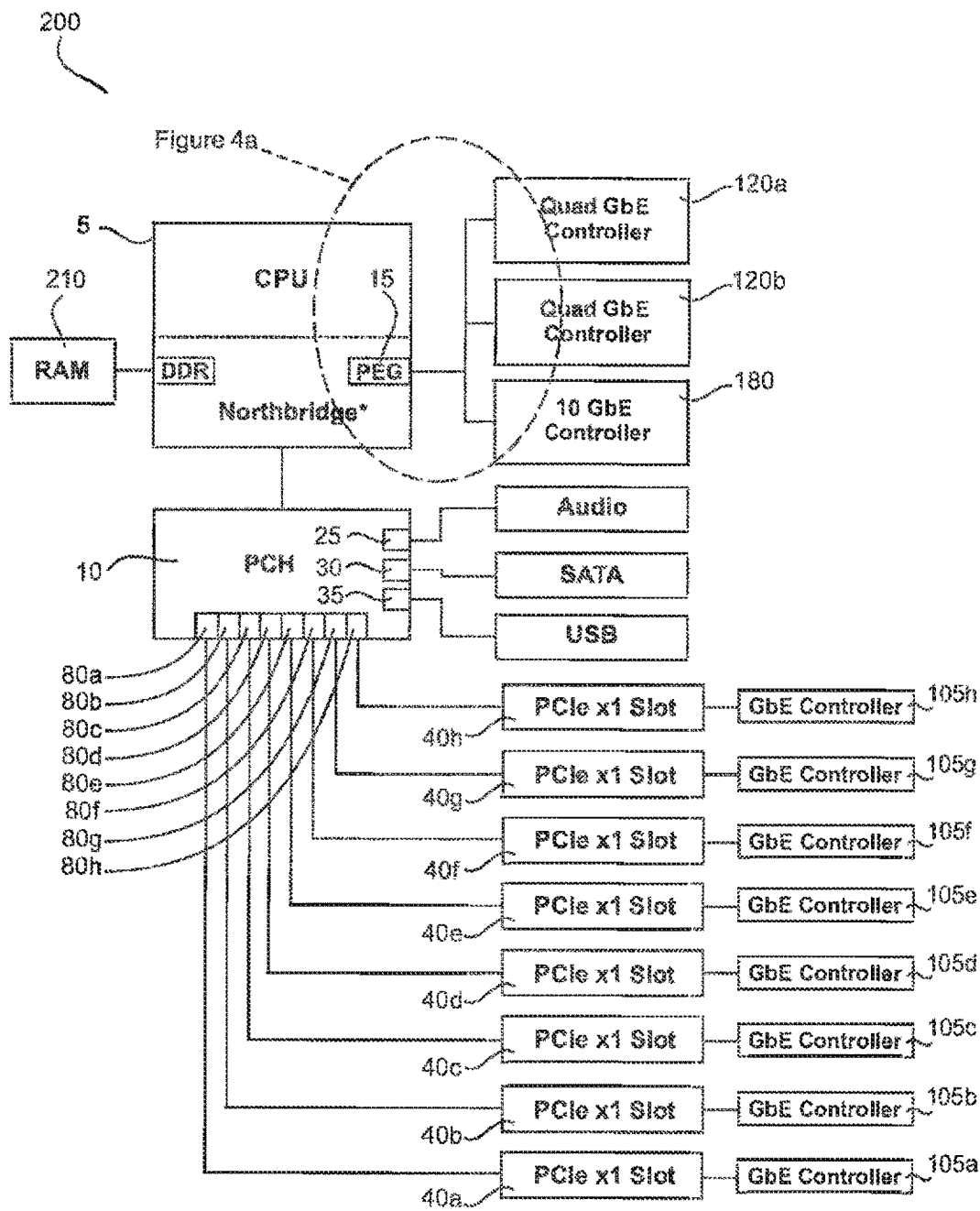

Referring now to FIG. 7 which is a cross sectional drawing of a passively cooled router 200. The router 200 comprises router chassis 700 and cooling fins 705. Chassis 700 is in close proximity to, thermal contact with, or thermally connected to (such as via a separate heat sink) various integrated circuit components of router 200, such as CPU 5, PCIe Switches 90*a*, 90*b*, or quad GbE controllers 120*a*, 120*b* and 120*c*. This allows chassis 700 and cooling fins 705 to passively dissipate power and conduct heat away from these integrated circuit components across a range of ambient operating temperatures without use of a fan. An extreme rugged configuration is configured to conduct heat away from the integrated circuit components and prevent them from overheating for ambient temperatures in the range minus 40 degrees Celsius to plus 85 degrees Celsius.

PCI switches may be sourced from Pericom, Avago Technologies, IDT, Texas Instruments, NSP and Microsemi. Ethernet controllers (GbE Controllers) may be sourced from Intel, Realtek, ASIX, Broadcom and QCA.

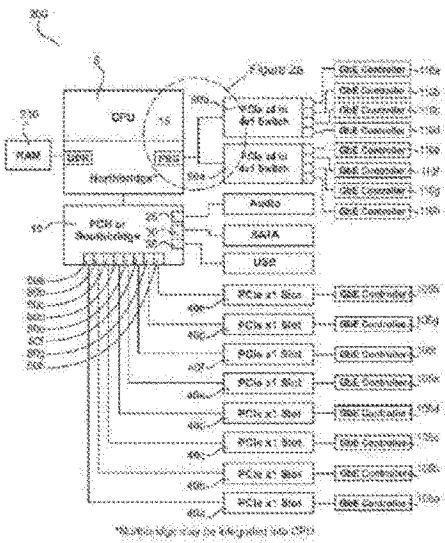

The invention claimed is:

1. A router adapted to route signals on communications networks, the router comprising:
    I/O ports for input of signals to the router from the communications networks and for output of signals from the router to the communications networks;
    a microprocessor in communication with a Southbridge or platform controller hub (SPCH), wherein at least a portion of the signals are transferred between the microprocessor and at least one of the I/O ports independently of the SPCH;
    a multi-lane PCI graphics port adapted to facilitate transfer of the portion of the signals between the microprocessor and at least one of the I/O ports independently of the SPCH associated with the microprocessor, wherein the multi-lane PCI graphics port is adapted to operate as at least two PCI sub-ports, and wherein at least one of the PCI sub-ports is a multi-lane PCI port.

2. The router as claimed in claim 1, wherein the multi-lane PCI graphics port is adapted to be bifurcated whereby it operates with two PCI sub-ports and at least one of the PCI sub-ports is the multi-lane PCI port.

3. The router as claimed in claim 1, wherein the multi-lane PCI graphics port is adapted to be trifurcated whereby it operates with three PCI sub-ports and at least one of the PCI sub-ports is the multi-lane PCI port.

4. The router as claimed in claim 1, wherein a PCI switch interfaces with at least one of the PCI sub-ports to provide multiple single lane PCI ports such that at least one of the single lane PCI ports communicates with at least one of the I/O ports thereby facilitating at least one single lane PCI communication path between the at least one I/O port and the microprocessor, and wherein the at least one single lane PCI communication path is routed to the microprocessor independently of any SPCH associated with the microprocessor.

5. The router as claimed in claim 4, wherein at least one of the single lane PCI ports communicates with a PCI I/O controller associated with at least one of the I/O ports.

6. The router as claimed in claim 4, wherein at least one of the single lane PCI ports communicates with a PCI I/O controller associated with at least one of the I/O ports, and wherein the PCI I/O controller is a PCI gigabit Ethernet controller and at least one of the I/O ports is a gigabit Ethernet port.

7. The router as claimed in claim 4, wherein the multi-lane PCI port supports automatic fall-back of PCI lanes such that the PCI switch has fewer PCI lanes than the multi-lane PCI port it interfaces with.

8. The router as claimed in claim 7, wherein the PCI switch is a four lane PCI switch, and the multi-lane PCI port is an eight lane PCI port.

9. The router as claimed in claim 4, wherein the router further comprises a PCI communications port providing a PCI communications path to the microprocessor through the SPCH.

10. The router as claimed in claim 9, wherein the multi-lane PCI graphics port is incorporated within the microprocessor, and wherein the microprocessor is a general purpose microprocessor.

11. The router as claimed in claim 4, wherein the router is passively cooled with a heat sink thermally coupled to a chassis of the router.

12. The router as claimed in claim 1, wherein the PCI port is bifurcated to provide two multi-lane PCI ports, and wherein each of the multi-lane PCI ports is in communication with a multi-lane PCI switch to convert each of the multi-lane PCI ports into multiple single lane PCI ports.

13. The router as claimed in claim 1, wherein each of the PCI sub-ports is an eight lane PCI sub-port in communication with a four lane PCI switch, whereby each of the PCI sub-ports is in communication with four single lane PCI ports, and wherein at least one of the single lane PCI ports facilitates a single lane PCI communication path between the microprocessor and at least one of the I/O ports independently of the SPCH.

14. The router as claimed in any one of claims 4, 5, 6, 7, 8, 12, and 13, wherein the router further comprises a passive cooling arrangement, which in operation cools at least one of the microprocessor, the SPCH, and the PCI switch using a heat sink thermally coupled to a chassis of the router to enable the router to operate in an ambient operating temperature range of minus 29° C. to plus 63° C., or minus 40° C. to plus 85° C.

15. The router as claimed in claim 1, wherein a multi-lane PCI I/O controller is arranged to communicate with at least one of the PCI sub-ports to provide multiple single lane I/O controllers in communication with the multi-lane PCI port.

16. The router as claimed in claim 13, wherein at least one of the single lane PCI ports is in communication with a gigabit Ethernet controller, and wherein at least one of the I/O ports is a gigabit Ethernet port.

17. The router as claimed in claim 1, wherein the multi-lane PCI port supports automatic fall-back whereby a multi-lane PCI I/O controller in communication with the multi-lane PCI port has fewer lanes than the multi-lane PCI port, and wherein the multi-lane PCI port is an eight lane PCI port and the multi-lane PCI I/O controller is a quad gigabit Ethernet controller whereby at least four of the I/O ports include gigabit Ethernet ports.

18. The router as claimed in claim 1, wherein two of the PCI sub-ports are in communication with quad gigabit Ethernet controllers, and wherein the router further comprises eight gigabit Ethernet ports in communication with the microprocessor independently of the SPCH.

19. The router as claimed in claim 18, wherein at least one PCI sub-port is an eight lane PCI port in communication with a 10 gigabit Ethernet controller, and wherein at least one of the I/O ports in communication with the microprocessor independent of the SPCH is a 10 gigabit Ethernet port.

20. The router as claimed in any one of claims 15, 17, 18, and 19, wherein the router further comprises a passive cooling arrangement, which in operation cools at least one of the microprocessor, the SPCH, and the multi-lane PCI I/O controller using a heat sink thermally coupled to a chassis of the router to enable the router to operate in an ambient operating temperature range of minus 29° C. to plus 63° C., or minus 40° C. to plus 85° C.

21. A router adapted to route signals on communications networks, the router comprising:
I/O ports for input of communication signals to the router from the communications networks and for output of communication signals from the router to the communications networks;
a microprocessor with a PCI graphics port for communication of graphics data to a peripheral device, the microprocessor adapted to communicate with a Southbridge or platform controller hub (SPCH), which the SPCH is adapted to provide communication between the microprocessor and the peripheral device, and wherein the PCI graphics port is adapted to provide communication of communications signals between the microprocessor and at least one of the I/O ports independently of the SPCH, and wherein the PCI graphics port is either bifurcated or trifurcated to operate with two multi-lane PCI sub-ports.

22. The router as claimed in claim 21, wherein a multi-lane PCI switch is in communication with at least one of the multi-lane sub-ports to provide single lane PCI ports, and wherein at least one of the single lane PCI ports provide a communications path between at least one of the I/O ports and the microprocessor independent of any SPCH.

23. The router as claimed in claim 22 further comprising two PCI switches each of which is in communication with a separate one of the PCI sub-ports to provide multiple single lane PCI ports associated with the PCI graphics port and the I/O ports.

24. The router as claimed in claim 22, wherein at least one of the single lane PCI ports is in communication with a giga-bit ethernet controller associated with at least one of the I/O ports, and wherein at least one of the I/O ports is a gigabit Ethernet port.

25. The router as claimed in claim 21, wherein a first multi-lane PCI I/O controller is in communication with at least one of the multi-lane sub-ports to provide single lane PCI I/O controllers in communication with the I/O ports, wherein a communications path between at least one of the I/O ports and the microprocessor having the multi-lane PCI sub-port, and wherein the multi-lane PCI I/O controller is independent of any SPCH.

26. The router as claimed in claim 25, wherein the multi-lane PCI I/O controller is a quad gigabit Ethernet controller, and wherein the I/O ports are gigabit Ethernet ports.

27. The router as claimed in claim 26, wherein a second of the two multi-lane PCI sub-ports is in communication with a 10 gigabit Ethernet port, and wherein at least one of the I/O ports communicating with the microprocessor independent of the SPCH is a 10 gigabit Ethernet port.

28. A method of routing signals within a communications network including a router, the router
including I/O ports adapted to receive signals from the communications network and output of signals to the communications network,
a microprocessor in communication with a multi-lane PCI graphics port, and
a first communications path between one of the I/O ports and the multi-lane PCI graphics port that is independent of a Southbridge or PCH (SPCH) associated with the microprocessor, wherein the multi-lane PCI graphics port is adapted to operate with two sub-ports, wherein at least one of the sub-ports is incorporated within the first communications path,
the method comprising:
i. receiving a signal at one of the I/O ports;
ii. transferring the signal to the microprocessor and one of the sub-ports via the first communications path;
iii. processing the signal in the microprocessor using routing software to produce a processed signal; and
iv. transferring the processed signal to one of the I/O ports via the first communications path.

29. The method of claim 28, wherein the router further comprises a multi-lane PCI switch in communication with at least one of the sub-ports, and wherein the step of transferring the signal to the microprocessor and one of the sub-ports via the first communications path includes transferring the signal between:
the multi-lane sub-port of the PCI graphics port and a multi-lane port of the PCI switch; and
a single lane port of the PCI switch and one of the I/O ports.

30. The method of claim 28, wherein the router further comprises a multi-lane PCI I/O controller in communication with at least one of the multi-lane sub-ports, and wherein the step of transferring the signal to the microprocessor and one of the sub-ports via the first communications path includes transferring the signal between:
the multi-lane sub-port of the PCI graphics port and a multi-lane port of the multi-lane PCI I/O controller; and
a single lane port of said multi-lane PCI I/O controller and one of the I/O ports.

31. The method of claim 28 wherein the router further comprises a heat sink thermally coupled to the microprocessor, the heat sink operating to conduct heat away from the microprocessor whereby the router is adapted to operate within an ambient operating temperature range between minus 30° C. to plus 63° C., and wherein the method further comprises passively cooling the microprocessor by the heat sink thermally conducting heat to a chassis of the router.

32. The method of claim 31, wherein the ambient operating temperature range is between minus 40° C. to plus 85° C.

33. The method as claimed in claim 28, wherein a second of the two multi-lane PCI sub-ports is in communication with a second quad gigabit Ethernet controller, and wherein at least four of the I/O ports comprise gigabit Ethernet controllers.

* * * * *

UNITED STATES PATENT AND TRADEMARK OFFICE
CERTIFICATE OF CORRECTION

| | | |
|---|---|---|
| PATENT NO. | : 10,877,920 B2 | Page 1 of 10 |
| APPLICATION NO. | : 15/765616 | |
| DATED | : December 29, 2020 | |
| INVENTOR(S) | : Christopher James Lockwood | |

It is certified that error appears in the above-identified patent and that said Letters Patent is hereby corrected as shown below:

On the Title Page

Column 2, Line 34, after item (57), delete "7 Drawing Sheets" and insert -- 8 Drawing Sheets --, therefor; and delete illustrative Figure 2 and insert the attached title page therefor including illustrative Figure 2.

In the Drawings

Sheet 1, delete Sheet 1 of 7 and insert attached Sheet 1 of 8, therefor.

Sheet 2, delete Sheet 2 of 7 and insert attached Sheet 2 of 8, therefor.

Sheet 3, delete Sheet 3 of 7 and insert attached Sheet 3 of 8, therefor.

Sheet 4, delete Sheet 4 of 7 and insert attached Sheet 4 of 8, therefor.

Sheet 5, delete Sheet 5 of 7 and insert attached Sheet 5 of 8, therefor.

Sheet 6, delete Sheet 6 of 7 and insert attached Sheet 6 of 8, therefor.

Sheet 7, delete Sheet 7 of 7 and insert attached Sheet 7 of 8, therefor.

Insert new attached Sheet 8 of 8.

Signed and Sealed this
Twentieth Day of July, 2021

Drew Hirshfeld
*Performing the Functions and Duties of the
Under Secretary of Commerce for Intellectual Property and
Director of the United States Patent and Trademark Office*

(12) United States Patent
Lockwood

(10) Patent No.: US 10,877,920 B2
(45) Date of Patent: Dec. 29, 2020

(54) COMMUNICATIONS DEVICE FOR ROUTING SIGNALS ON COMMUNICATIONS NETWORKS

(71) Applicant: AVI PTY LTD, Booragoon (AU)

(72) Inventor: Christopher James Lockwood, Melville (AU)

(73) Assignee: AVI PTY LTD, Booragoon (AU)

(*) Notice: Subject to any disclaimer, the term of this patent is extended or adjusted under 35 U.S.C. 154(b) by 69 days.

(21) Appl. No.: 15/765,616

(22) PCT Filed: Oct. 14, 2016

(86) PCT No.: PCT/AU2016/050971
§ 371 (c)(1),
(2) Date: Apr. 3, 2018

(87) PCT Pub. No.: WO2017/063050
PCT Pub. Date: Apr. 20, 2017

(65) Prior Publication Data
US 2018/0276173 A1 Sep. 27, 2018

(30) Foreign Application Priority Data
Oct. 16, 2015 (AU) .................. 2015904257

(51) Int. Cl.
G06F 13/42 (2006.01)
H04L 12/46 (2006.01)
G06F 13/40 (2006.01)
H04L 12/713 (2013.01)

(52) U.S. Cl.
CPC ...... *G06F 13/4221* (2013.01); *G06F 13/4022* (2013.01); *G06F 13/4068* (2013.01); *H04L 12/4625* (2013.01); *H04L 45/586* (2013.01); *G06F 2213/0024* (2013.01); *G06F 2213/0026* (2013.01); *G06F 2213/0032* (2013.01)

(58) Field of Classification Search
CPC ............ G06F 13/4221; G06F 13/4068; G06F 13/4022; G06F 13/38; G06F 2213/0024; G06F 2213/0026; G06F 2213/0032; H04L 45/586; H04L 12/4625; H04L 49/35
See application file for complete search history.

(56) References Cited

U.S. PATENT DOCUMENTS

2006/0242333 A1   10/2006 Johnsen et al.
2012/0030306 A1*  2/2012 Kami ............... G06F 3/0617
                                                    709/213
2015/0067229 A1   3/2015 Connor et al.

OTHER PUBLICATIONS

International Search Report for Application No. PCT/AU2016/050971 dated Jan. 9, 2017, 3 pages.

* cited by examiner

*Primary Examiner* — Glenn A. Auve
(74) *Attorney, Agent, or Firm* — Seyfarth Shaw LLP

(57) ABSTRACT

A router for routing signals on communications networks; said router comprising a plurality of I/O ports for input to the router of said signals and for output from the router of said signals; said router comprising at least one microprocessor; said router adapted such that said microprocessor communicates with at least one of said I/O ports independently of any Southbridge or platform controller hub (SPCH) associated with said microprocessor.

33 Claims, 8 Drawing Sheets